(12) United States Patent
Schafrik et al.

(10) Patent No.: US 11,338,232 B2
(45) Date of Patent: May 24, 2022

(54) EFFICIENT NON-CLOGGING INERTIAL VORTEX TYPE PARTICLE SCRUBBER

(71) Applicant: University of Kentucky Research Foundation, Lexington, KY (US)

(72) Inventors: Steven J. Schafrik, Lexington, KY (US); Ashish Ranjan Kumar, Lexington, KY (US); Allison Taylor, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 17/084,073

(22) Filed: Oct. 29, 2020

(65) Prior Publication Data

US 2021/0138379 A1 May 13, 2021

Related U.S. Application Data

(60) Provisional application No. 62/931,860, filed on Nov. 7, 2019.

(51) Int. Cl.
*B01D 46/00* (2022.01)
*B01D 45/16* (2006.01)
*B04C 5/103* (2006.01)
*B04C 5/081* (2006.01)
*B04C 5/04* (2006.01)

(52) U.S. Cl.
CPC .............. *B01D 45/16* (2013.01); *B04C 5/04* (2013.01); *B04C 5/081* (2013.01); *B04C 5/103* (2013.01)

(58) Field of Classification Search
CPC .... B01D 45/16; B01D 50/004; B01D 47/024; B01D 47/027; B04C 5/103; B04C 5/081; B04C 5/04; B04C 2009/008; B04C 1/00; B05B 14/46; B05B 14/468
See application file for complete search history.

(56) References Cited

U.S. PATENT DOCUMENTS

| 1,239,456 | A | * | 9/1917 | Brantingham | ......... | B01D 45/16 55/394 |
| 2,904,130 | A | * | 9/1959 | Chapler, Jr. | .............. | B04C 5/28 55/344 |
| 3,546,851 | A | * | 12/1970 | Hardison | ............. | B01D 47/027 96/313 |

(Continued)

FOREIGN PATENT DOCUMENTS

EP 1258294 A2 11/2002

OTHER PUBLICATIONS

Taylor; "The Redesigned Vortecone: A Maintenance-Free Wet Scrubber Device"; https://uknowledge.uky.edu/mng_etds/48; Theses and Disseratations—Mining Engineering, 48; Apr. 17, 2019; pp. 1-81.

*Primary Examiner* — Dung H Bui
(74) *Attorney, Agent, or Firm* — Stites & Harbison, PLLC; Warren D. Schickli

(57) ABSTRACT

An inertial vortex particle scrubber includes a housing having an inlet guide, twin vortex chambers and an outlet. A particle-laden air stream is accelerated as it passes through the inlet guide into the twin vortex chambers where particles are displaced by centrifugal forces toward a wall of the twin vortex chambers. A relatively particle-free air stream is then discharged from the outlet.

17 Claims, 5 Drawing Sheets

(56) References Cited

U.S. PATENT DOCUMENTS

| | | | | |
|---|---|---|---|---|
| 4,205,968 A * | 6/1980 | Hakala | B01D 47/06 |
| | | | 261/109 |
| 4,483,698 A * | 11/1984 | Kuchenthal | B01D 47/10 |
| | | | 96/311 |
| 4,702,846 A * | 10/1987 | Ryynanen | B01D 45/12 |
| | | | 209/722 |
| 5,269,637 A * | 12/1993 | Gomes, Jr. | B04C 1/00 |
| | | | 209/722 |
| 5,944,001 A * | 8/1999 | Hutchins | B01D 45/16 |
| | | | 123/572 |
| 6,024,796 A * | 2/2000 | Salazar | B05B 14/46 |
| | | | 118/326 |
| 7,419,521 B2 * | 9/2008 | Oh | B04C 5/04 |
| | | | 55/337 |
| 8,241,405 B2 * | 8/2012 | Salazar | B05B 14/468 |
| | | | 95/219 |
| 9,273,646 B2 * | 3/2016 | Oelpke | F02M 35/0223 |
| 9,499,443 B2 * | 11/2016 | Foret | B01J 8/087 |
| 9,516,736 B2 * | 12/2016 | Foret | H05H 1/38 |
| 9,795,898 B2 * | 10/2017 | Ernst | B01D 19/0026 |
| 2011/0159596 A1 * | 6/2011 | Keinan | G01N 1/2211 |
| | | | 436/52 |
| 2012/0175792 A1 * | 7/2012 | Nieuwoudt | B01D 3/205 |
| | | | 261/128 |
| 2016/0243487 A1 * | 8/2016 | Kim | A23F 5/04 |
| 2018/0036653 A1 * | 2/2018 | Ernst | B04C 5/04 |
| 2018/0296945 A1 * | 10/2018 | Nieuwoudt | B01D 3/008 |
| 2020/0009487 A1 * | 1/2020 | Vanaudenhove | F02M 35/10262 |
| 2020/0094266 A1 * | 3/2020 | Conrad | A47L 9/1641 |
| 2020/0318918 A1 * | 10/2020 | Brooks | F28F 13/12 |
| 2021/0093996 A1 * | 4/2021 | Cremaschi | B04C 5/103 |

* cited by examiner

EFFICIENT NON-CLOGGING INERTIAL VORTEX TYPE PARTICLE SCRUBBER

RELATED APPLICATION

This application claims priority to U.S. Provisional Patent Application Ser. No. 62/931,860 filed on Nov. 7, 2019 which is hereby incorporated by reference in its entirety.

GOVERNMENT SUPPORT

This invention was made with government support under Grant No. 304-811-1957 awarded by the NIOSH, CDC. The government has certain rights in the invention.

TECHNICAL FIELD

This document relates generally to a new and improved efficient, non-clogging inertial vortex type particle scrubber.

BACKGROUND

This document relates to a new and improved inertial vortex particle scrubber that acts as a filter advantageously providing low pressure drops and hence lower power requirements for a given cleaning efficiency. The inertial vortex particle scrubber is expected to find widespread applications in mining and other industries dealing with aerosols and other particulate matter.

SUMMARY

In accordance with the purposes and benefits described herein, a new and improved inertial vortex particle scrubber is provided. That inertial vortex particle scrubber comprises a housing having an inlet guide, twin vortex chambers and an outlet. A particle-laden air stream passes through the inlet guide into the twin vortex chambers and particles are displaced by centrifugal forces toward a wall of the twin vortex chambers and relatively particle free air is then discharged from the outlet.

More specifically, the inertial vortex particle scrubber forces the particle-laden air to accelerate by forcing it through the inlet guide with progressively decreasing cross-sectional area. That particle-laden air stream then flows into the twin vortex chambers where it undergoes rapid circulatory motion. Dust particles are preferentially cast outwards towards the vortex chamber wall due to their higher mass.

In one or more of the many possible embodiments of the inertial vortex particle scrubber, an optional spray nozzle adjacent the inlet guide sprays a particle entraining liquid, such as water or water and an appropriate flocculant, toward the interior walls of the inlet guide to capture and entrain the particles from the particle-laden air stream and increase the filtering efficiency of the device.

The twin vortex chambers include a first vortex chamber configured for air flow in a clockwise direction and a second vortex chamber configured for air flow in a counter-clockwise direction. The wall of the twin vortex chambers includes a first vertex opposite the inlet guide. A first portion of the wall on each side of the first vertex has a first radius of curvature $R_1$ and a second portion of the wall extending at least partially between the first portion of the wall on each side of the first vertex and the inlet guide has a second radius of curvature $R_2$. Typically $R_1 < R_2$.

In one or more of the many possible embodiments of the inertial vortex particle scrubber, a first baffle in the first vortex chamber divides the first vortex chamber into a first upper section and a first lower section.

In one or more of the many possible embodiments of the inertial vortex particle scrubber, a second baffle in the second vortex chamber divides the second vortex chamber into a second upper section and a second lower section.

In such embodiments, that first baffle may extend between the inlet and the first vertex in the first vortex chamber and that second baffle may extend between the inlet and the second vertex in the second vortex chamber.

In such embodiments, the inlet guide discharges the particle-laden air stream into the first and second upper sections of the twin vortex chambers and the outlet is in communication with the first and second lower sections of the twin vortex chambers.

In one or more of the many possible embodiments of the inertial vortex particle scrubber, the wall may include a second vertex opposite the outlet, a third portion of the wall on each side of the second vertex having a third radius of curvature $R_3$ and a fourth portion of the wall extending at least partially between the third portion of the wall and the outlet having a fourth radius of curvature $R_4$. Typically $R_3 < R_4$.

In one or more of the many possible embodiments of the inertial vortex particle scrubber, flat wall portions are provided between the first portion and the second portion and the third portion and the fourth portion of the wall.

In one or more particularly useful embodiments of the inertial vortex particle scrubber, the inlet guide has a width of 5.06a and a height of 2.42a at an upstream end and a width of 1.34a and a height of 2.42a at a downstream end wherein "a" is any generic dimensional parameter (e.g. 5 centimeters, one foot, one meter, six inches).

In one or more particularly useful embodiments of the inertial vortex particle scrubber, $R_1$ is 0.75a, $R_2$ is 1.86a, $R_3$ is 0.75a and $R_4$ is 1.86a. Further, the outlet may have a width of 5.08a and a height of 2.42a.

In the following description, there are shown and described several preferred embodiments of the inertial vortex particle separator. As it should be realized, the inertial vortex particle separator is capable of other, different embodiments and its several details are capable of modification in various, obvious aspects all without departing from device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the inertial vortex particle scrubber and together with the description serve to explain certain principles thereof.

FIG. 1 is an upper perspective view of the new and improved inertial vortex particle scrubber having the outlet oriented toward the viewer.

FIG. 2 is a bottom perspective view of the upper portion of the inertial vortex particle scrubber illustrated in FIG. 1 with the first and second lower sections of the twin vortex chambers removed so as to illustrate in detail the inlet guide that directs (a) the air stream and (b) the particle entraining liquid from the optional spray nozzle into the first and second upper sections of the twin vortex chambers.

Figure 1:
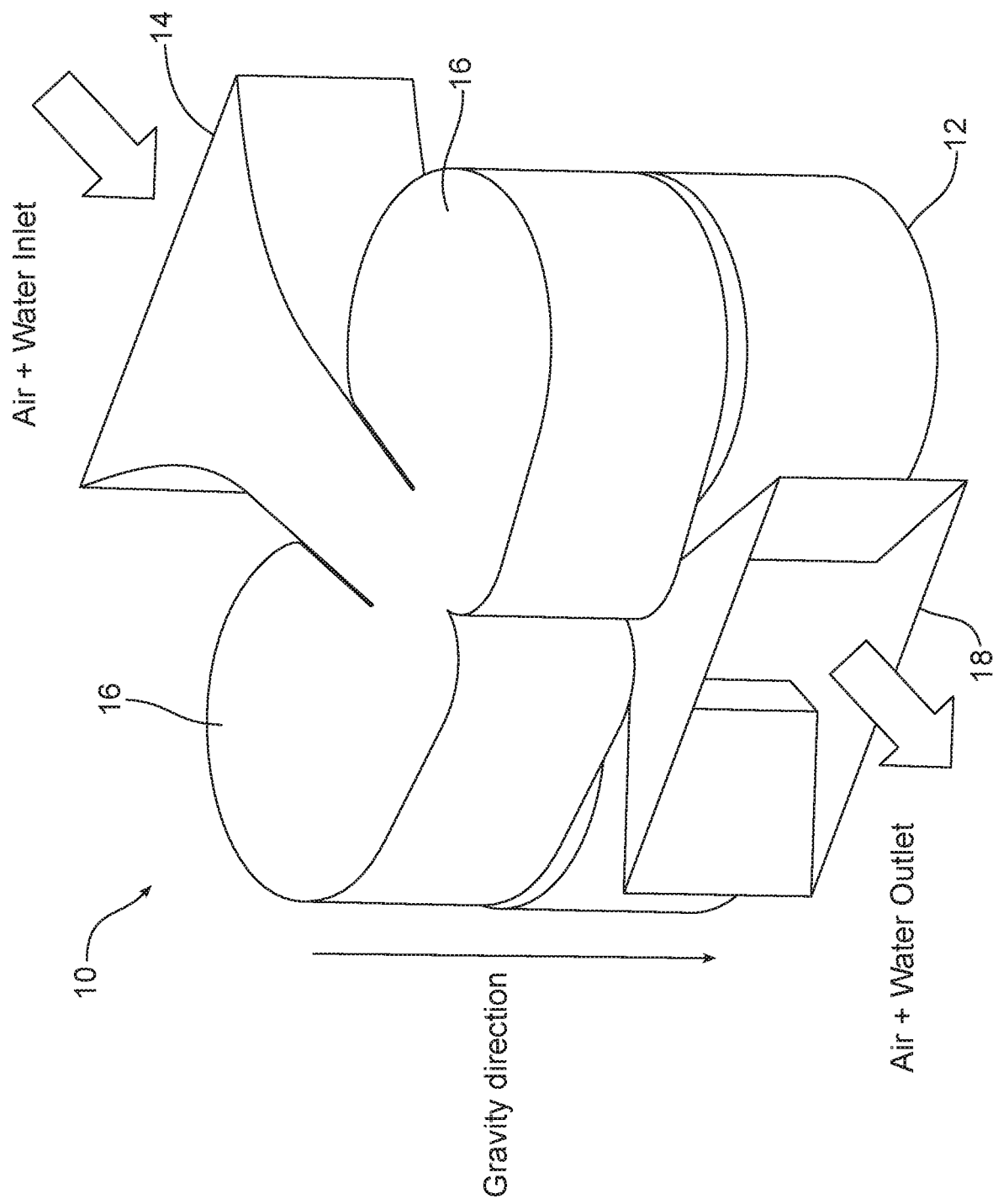

Reference will now be made in detail to the present preferred embodiments of the vortex particle scrubber, examples of which are illustrated in the accompanying drawing figures.

DETAILED DESCRIPTION

Reference is now made to FIGS. 1-5 which clearly illustrate the new and improved inertial vortex particle scrubber or device 10 that is the subject matter of this document. The device 10 generally includes a housing 12 made from metal, plastic, plastic composite or other appropriate material.

The housing 12 includes an inlet guide 14, twin vortex chambers 16 and an outlet 18. As will be described in greater detail below, a particle-laden air stream passes through the inlet guide 14 into the twin vortex chambers 16, where the particles are displaced by centrifugal force toward the wall 20 of the twin vortex chambers with relatively particle-free air then being discharged from the outlet 18.

In some particularly useful embodiments of the device 10, an optional spray nozzle 22 is provided at the inlet guide 14. The spray nozzle 22 is adapted to spray a particle entraining liquid L in a wide spray pattern into the onrushing air stream so that the spray is displaced toward the interior walls 24 of the inlet guide A. That particle entraining liquid L is adapted to collect on the downstream wall 20 of the twin vortex chambers 16 and capture and entrain particles from the particle-laden air stream as those particles are forced toward the wall. Useful particle entraining liquids include water and water mixed with an appropriate flocculant adapted for capturing the type of particles to be removed or filtered from the particle-laden air stream being processed.

Figure 2:
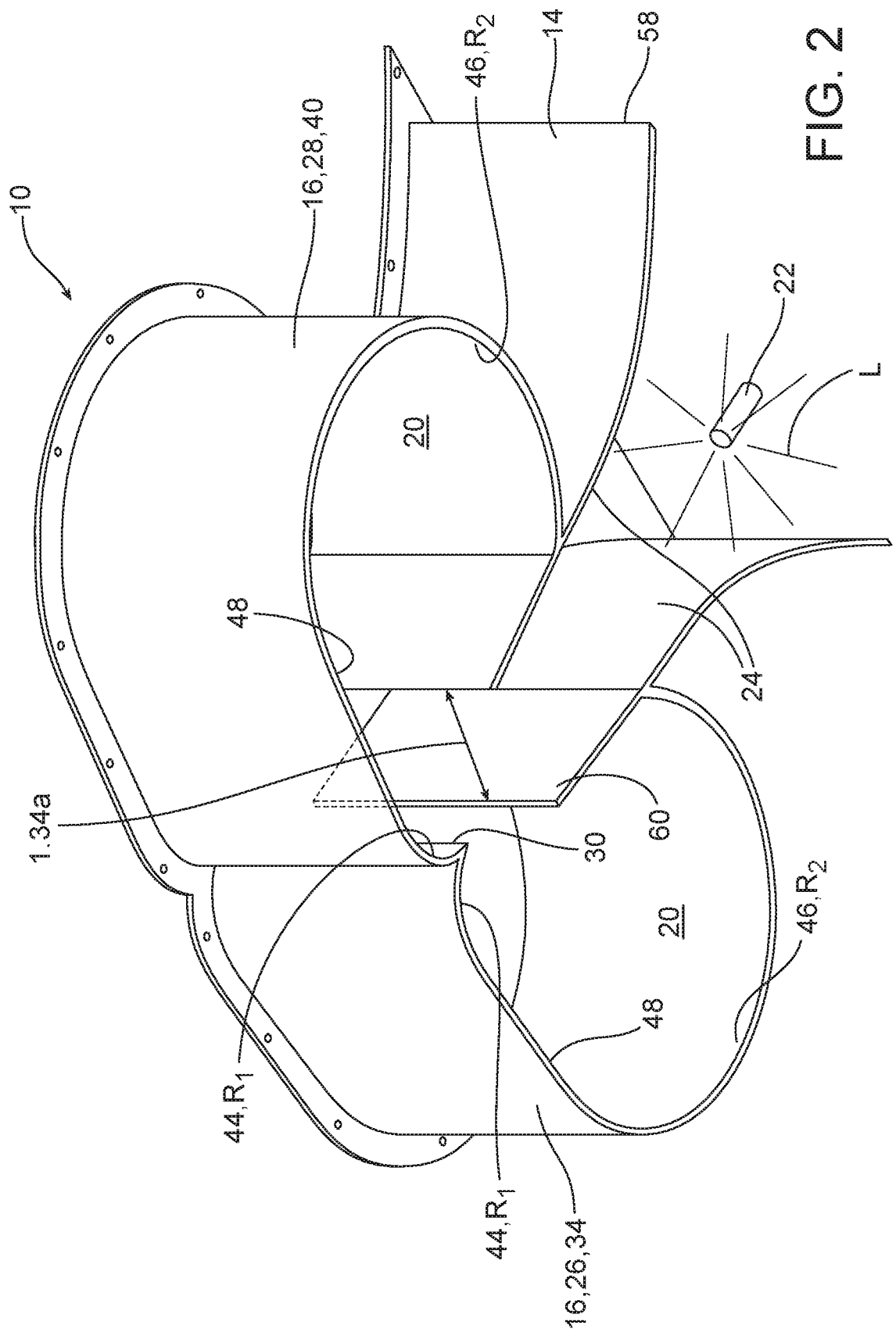

As best illustrated in FIGS. 1 and 2, the walls 24 of the inlet guide 14 have a progressively decreasing cross-sectional area in the direction of the air flow into the twin vortex chambers 16 (that is, from the upstream end 58 to the downstream end 60). This ensures acceleration of the particle-laden air stream as it enters the twin vortex chambers 16. As illustrated, the twin vortex chambers 16 include a first vortex chamber 26 configured for air flow in a clockwise direction and a second vortex chamber 28 configured for air flow in a counter-clockwise direction (when viewed from above).

Figure 3:
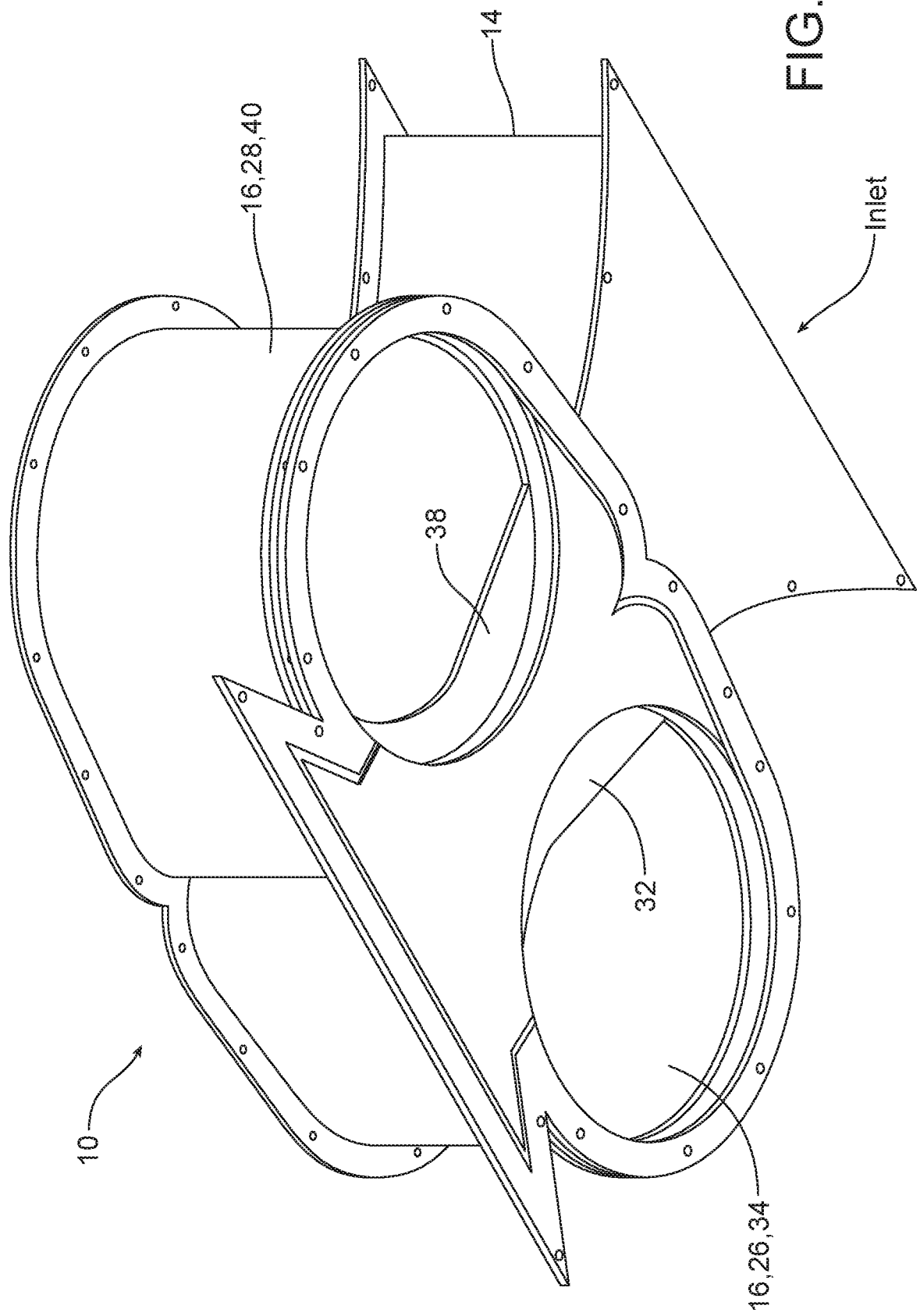
FIG. 3 is a view similar to FIG. 2 but illustrating the baffles that divide the twin vortex chambers into upper and lower sections.

As illustrated in FIG. 3, the first vortex chamber 26 is divided by a first baffle 32 into a first upper section 34 and a first lower section 36. Similarly, the second vortex chamber 28 is divided by a second baffle 38 into a second upper section 40 and a second lower section 42. The inlet guide 14 delivers the particle-laden air stream into the first and second upper sections 34, 40 while the outlet 18 is in communication with and receives the relatively particle-free air stream from the first and second lower sections 36, 42.

The wall 20 of the twin vortex chambers 16 includes a first vertex 30 opposite the inlet guide 14 that effectively divides the incoming particle-laden air stream into two equal portions with the first portion directed into the first upper section 34 of the first vortex chamber 26 and the second portion directed into the second upper section 40 of the second vortex chamber 28.

As best illustrated in FIG. 2, a first portion 44 of the wall 20 on each side of the vertex 30 has a first radius of curvature $R_1$ and a second portion 46 of the wall extending at least partially between the first portion of the wall on each side of the first vertex and the inlet guide has a second radius of curvature $R_2$. Typically $R_1 < R_2$. The wall 20 further includes flat portions 48 between the first portions 44 and the second portions 46 on each side of the first vertex 30.

The relatively tight radius of curvature $R_1$ of the first portion 44 serves to rapidly bring particles in the particle-laden air stream into contact with the wall 20 where they tend to remain. This is particularly true when a particle entraining liquid is used to increase the operation efficiency of the device 10. The relatively flat portion 48 that transitions to the second portion 46 with the larger radius of curvature $R_2$ functions to maintain the vortex air stream minimizing pressure drop and power requirements.

Figure 4:
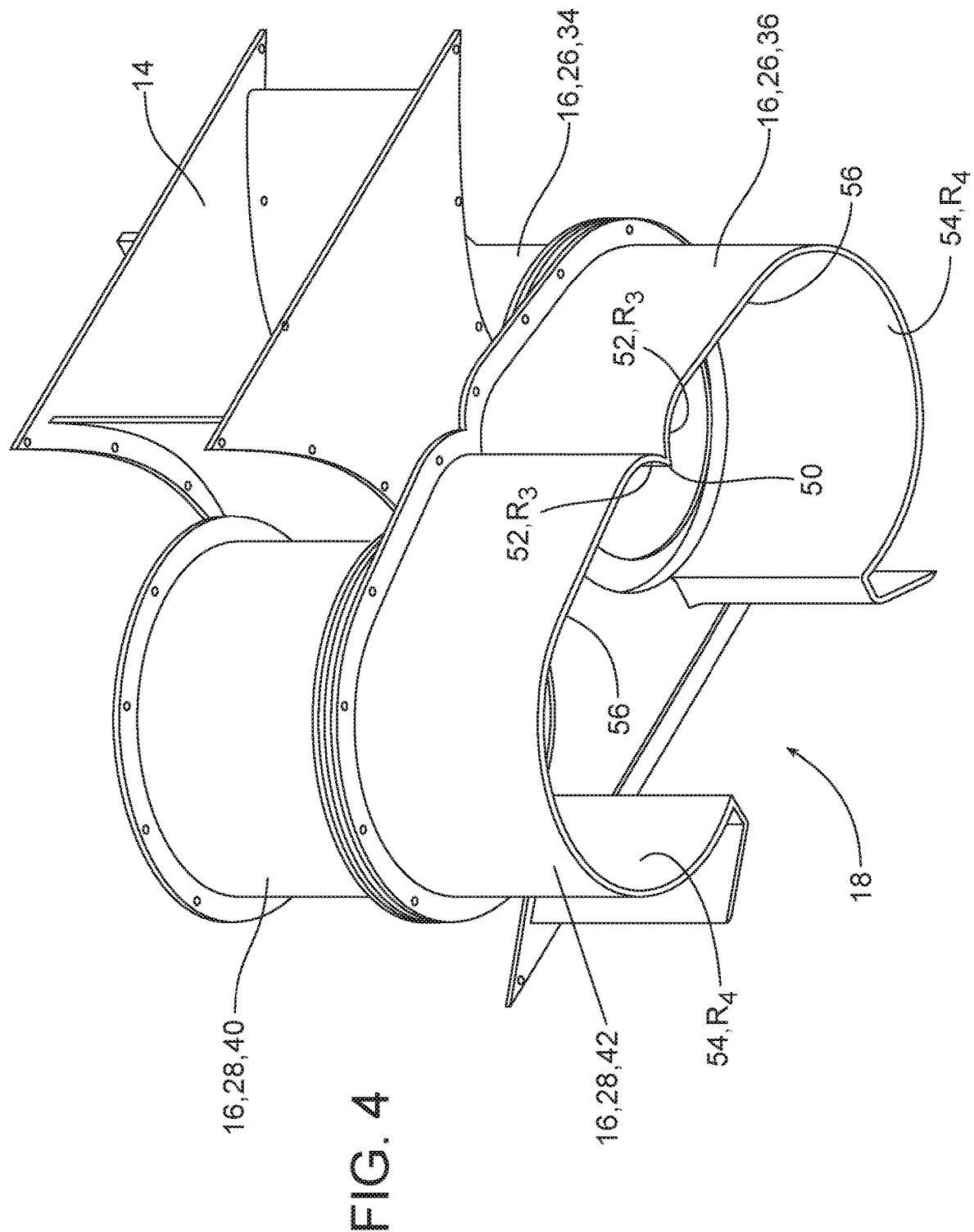
FIG. 4 is a bottom perspective view of the inertial vortex particle separator of FIG. 1 with the bottom wall removed so as to expose the interior wall of the two lower sections of the twin vortex chambers.
Figure 5:
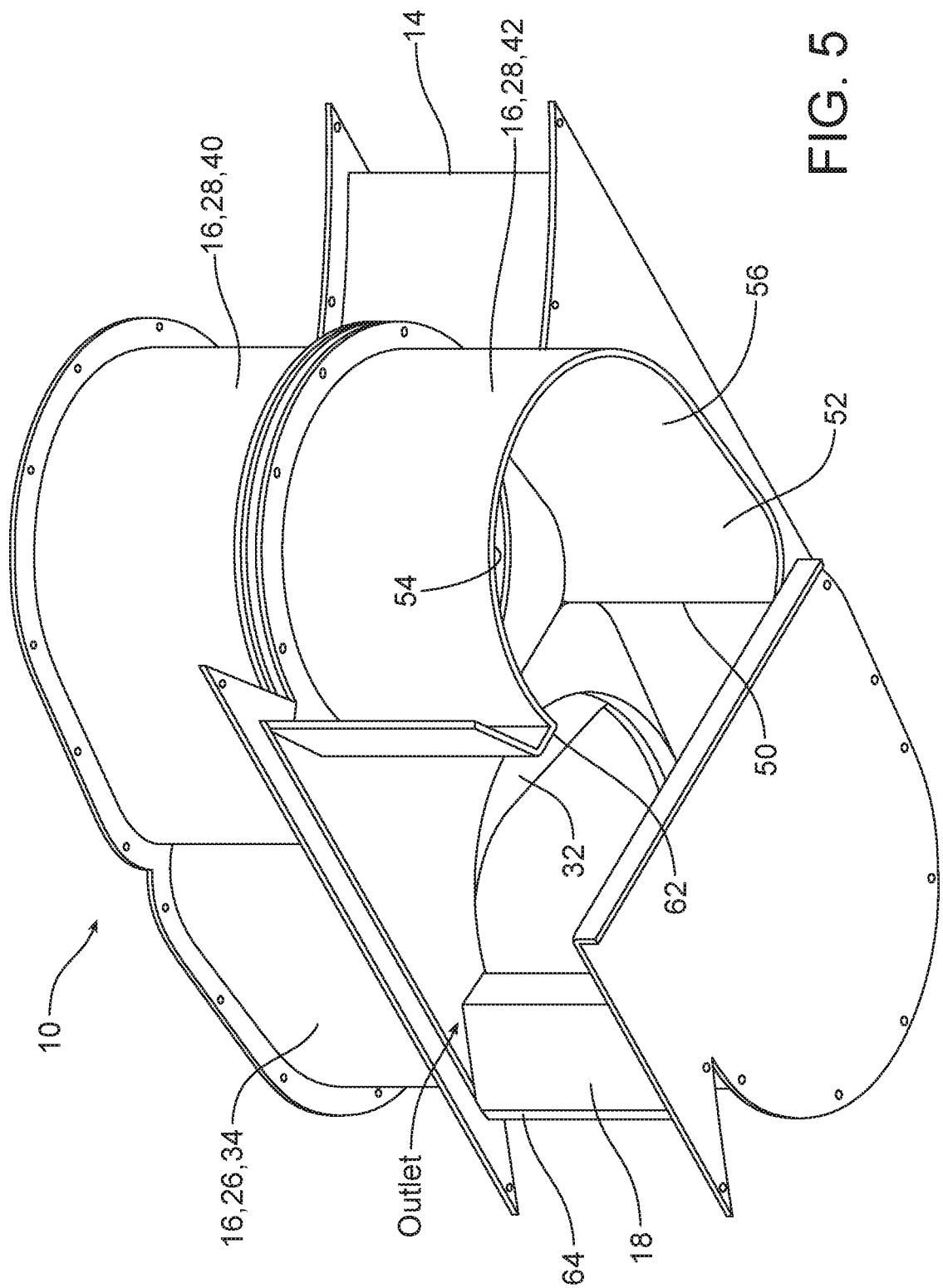
FIG. 5 is a view similar to FIG. 4 except only the left half of the bottom wall has been removed and the outlet has been oriented toward rather than away from the viewer.

As best illustrated in FIG. 4, the wall 20 includes a second vertex 50 opposite the outlet 18. A third portion 52 of the wall 20 extending on each side of the second vertex 50 has a third radius of curvature $R_3$ and a fourth portion 54 of the wall extending at least partially between the third portion of the wall and the outlet 18 has a fourth radius of curvature $R_4$ where $R_3 < R_4$. The wall 20 further includes flat portions 56 between the third portions 52 and the fourth portions 54 on each side of the second vertex 50.

In one particularly useful embodiment of the device 10, the inlet guide 14 has a width of about 5.06a and a height of about 2.42a at an upstream end 58 and a width of about 1.34a and a height of about 2.42a at a downstream end 60 where "a" is any generic dimensional parameter. In such an embodiment of the device 10, $R_1$ and $R_3$ may be 0.75a and $R_2$ and $R_4$ may be 1.86a. Further, the outlet 18 may have a width of 5.08a and a height of 2.42a.

The relatively tight radius of curvature $R_1$ of the first portion 44 of the wall 20 and the flat portions 48 tend to cause particles in the particle-laden air stream to engage with and flow along the wall 20 while the decreased radius of curvature $R_2$ of the second portions 46 tends to allow for smooth and efficient flow of the air stream through the first and second upper sections 34, 40 of the twin vortex chambers 16, minimizing pressure drop and power requirements. The baffles 32 and 38 provide mechanical strength, divide the upper sections 34, 40 from the lower sections 36, 42 of the twin vortex chambers 16 and also provide additional surface for capturing particles and removing them from the particle-laden air stream being processed.

As the air stream continues to pass through the twin vortex chambers 16, the now partially cleaned air stream moves past the baffles 32, 38 into the lower sections 36, 42 of the twin vortex chambers 16. Initially the air stream flows smoothly along the fourth portion 54 of the wall 20 having the fourth radius of curvature $R_4$ then flattens out along the flat portions 56 before flowing along the third portions 52 having a radius of curvature $R_3$. The tighter radius of curvature $R_3$ provided by the third portions 52 of the wall 20 provide for enhanced particle to wall impingement and the final cleaning of particles from the air stream before the air stream is rerouted by the second vertex 50 toward the outlet 18. As should be appreciated, outlet 18 increases in cross sectional area from the upstream end 62 oriented toward the second vertex 50 to the downstream end 64.

It should be appreciated that both relatively particle-free air and relatively particle-laden particle entraining liquid is discharged from the outlet 18. The heavier particle-laden particle entraining liquid eventually settles toward the bottom of any downstream discharge conduit (not shown) that is connected to the outlet 18 where it can be collected and separated from the relatively particle-free air stream in a manner known in the art. Further, it should be appreciated that the collected and separated particle entraining liquid may be recycled to the spray nozzle 22 and once again used to collect and entrain particles from the particle-laden air stream in the device 10 as described above.

The device 10 has a wide range of potential uses including, but not necessarily limited to capture of dust particles in the air. The particle entraining liquid used with the device may vary depending upon the application and the type of particles targeted for removal from the particle-laden air stream. For example, where the device is used for coal dust capture, the particle entraining liquid may include water mixed with a medium anionic flocculant, which tends to bind and entrain the coal particles.

In contrast, where the device 10 is used for dusts including high levels of organic compounds, the particle entraining liquid may include water mixed with a cationic flocculant, typical in commercial soaps, which tends to bind and entrain the particles.

The amount of water and flocculant utilized depends upon several factors including the air flow volume and speed, the type of particle to be collected or filtered from the particle-laden air stream and the concentration of the particles in that air stream. Further, device 10's separation mechanism does not depend on gravity, making the efficiency the same in low and no gravity applications. The sharp jagged nature of lunar dust would be captured with this device without water efficiently because of the separation mechanism.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An inertial vortex particle scrubber, comprising:

a housing having an inlet guide, twin vortex chambers and an outlet wherein (a) a particle-laden air stream passes through the inlet guide into the twin vortex chambers and particles are displaced by centrifugal forces toward a wall of the twin vortex chambers and relatively particle free air is then discharged from the outlet, (b) the wall includes a first vertex opposite the inlet guide, a first portion of the wall on each side of the first vertex having a first radius of curvature $R_1$ and a second portion of the wall extending at least partially between the first portion of the wall on each side of the first vertex and the inlet guide having a second radius of curvature $R_2$, where $R_1<R_2$, and (c) the wall includes a second vertex opposite the outlet, a third portion of the wall on each side of the second vertex having a third radius of curvature $R_3$ and a fourth portion of the wall extending at least partially between the third portion of the wall and the outlet having a fourth radius of curvature $R_4$, where $R_3<R_4$.

2. The inertial vortex particle scrubber of claim 1, wherein the inlet guide has a progressively decreasing cross-sectional area in the direction of air flow.

3. The inertial vortex particle scrubber of claim 2, wherein the twin vortex chambers include a first vortex chamber configured for air flow in a clockwise direction and a second vortex chamber configured for air flow in a counter-clockwise direction.

4. The inertial vortex particle scrubber of claim 3, further including a first baffle in the first vortex chamber dividing the first vortex chamber into a first upper section and a first lower section.

5. The inertial vortex particle scrubber of claim 4, further including a second baffle in the second vortex chamber dividing the second vortex chamber into a second upper section and a second lower section.

6. The inertial vortex particle scrubber of claim 5, wherein the inlet guide delivers the particle-laden air stream into the first upper section and the second upper section of the twin vortex chambers.

7. The inertial vortex particle scrubber of claim 6, wherein the outlet is in communication with the first lower section and the second lower section of the twin vortex chambers.

8. The inertial vortex particle scrubber of claim 7, further including flat wall portions between the first portion and the second portion and the third portion and the fourth portion.

9. The inertial vortex particle scrubber of claim 8, wherein the first baffle extends between the inlet and the first vertex in the first vortex chamber and the second baffle extends between the inlet and the first vertex in the second vortex chamber.

10. The inertial vortex particle scrubber of claim 9, wherein the inlet guide has a width of 5.06a and a height of 2.42a at an upstream end and a width of 1.34a and a height of 2.42a at a downstream end wherein "a" is any generic dimensional parameter.

11. The inertial vortex particle scrubber of claim 10, wherein $R_1$ is 0.75a and $R_2$ is 1.86a.

12. The inertial vortex particle scrubber of claim 11, wherein $R_3$ is 0.75a and $R_4$ is 1.86a.

13. The inertial vortex particle scrubber of claim 12, wherein the outlet has a width of 5.08a and a height of 2.42a.

14. The inertial vortex particle scrubber of claim 1, further including a spray nozzle adapted to spray a particle entraining liquid toward interior walls of the inlet guide to capture and entrain particles from the particle-laden air stream.

15. The inertial vortex particle scrubber of claim 14, wherein the twin vortex chambers include a first vortex chamber configured for air flow in a clockwise direction and a second vortex chamber configured for air flow in a counter-clockwise direction.

16. The inertial vortex particle scrubber of claim 15, further including a first baffle in the first vortex chamber dividing the first vortex chamber into a first upper section and a first lower section and a second baffle in the second vortex chamber dividing the second vortex chamber into a second upper section and a second lower section.

17. The inertial vortex particle scrubber of claim 16, wherein the inlet guide discharges the particle-laden air stream into the first and second upper sections of the twin vortex chambers and the outlet is in communication with the first lower section and the second lower section of the twin vortex chambers.

* * * * *